July 17, 1923.
A. MESSER
METHOD OF COOLING AIR
Filed Aug. 29, 1921
1,462,177
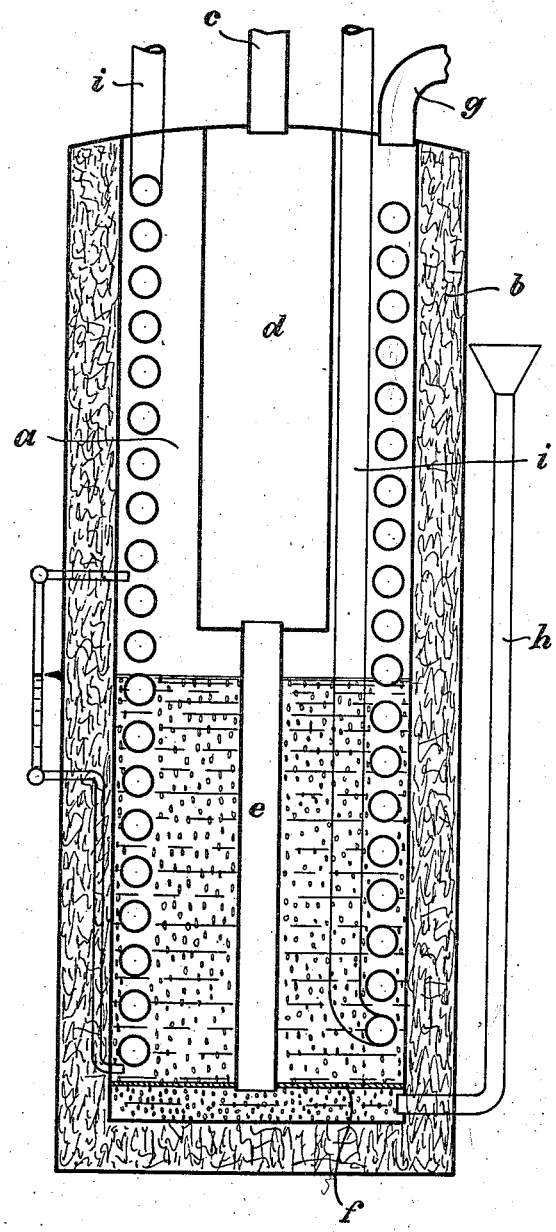
WITNESSES
INVENTOR Patented July 17, 1923.

1,462,177

UNITED STATES PATENT OFFICE.

ADOLF MESSER, OF FRANKFORT-ON-THE-MAIN, GERMANY.

METHOD OF COOLING AIR.

Application filed August 29, 1921. Serial No. 496,766.

(GRANTED UNDER THE PROVISIONS OF THE ACT OF MARCH 3, 1921, 41 STAT. L., 1313.)

*To all whom it may concern:*

Be it known that I, ADOLF MESSER, a citizen of the German Republic, residing at Frankfort-on-the-Main, Germany, have invented certain new and useful Improvements in Methods of Cooling Air (for which I have filed an application in Germany, July 11, 1914, Patent No. 300,041), of which the following is a specification.

In apparatus used for the liquefaction of air and separation of the liquid into nitrogen and oxygen it is common to use the cold outgoing gases to precool the incoming air which is to be liquefied and separated. This cooling effect is produced by causing the cold outgoing gases to flow in counter current and in heat exchanging relation to the incoming air. In this manner the cooling effect of the outgoing gases is fully utilized and leaves the apparatus in a comparatively warm state, that is, at about the same temperature as the air as it enters the apparatus. The air escaping from the liquefier and separator or the gases, nitrogen and oxygen, produced are completely dry and contain no water vapor for the reason that the compressed air before it gets into the liquefier is well dried by chemicals in order to avoid the freezing of the water vapor wherefrom a clogging could result of the counter-current serpentine arranged in the liquefier and consisting generally of a long tube with very narrow cross section. Interruptions of service would be caused by this clogging. By the low temperatures existing in the liquefier and separator even the smallest quantities of water vapor which should not have been taken up by the chemical drying freeze to ice and remain in this state in the liquefier and separator.

The invention consists in utilizing the absolute dryness of the gases escaping from the liquefier and separator for the production of cold by the evaporation of water and in the transmission of the cold thus produced to the compressed air flowing into the liquefier. It is not necessary that the cold which is transmitted in this manner to the compressed air be produced in the liquefier and separator by expansion and throttling. There will be obtained in this manner either a larger quantity of liquid air or the liquefier and separator will work, at similar output, with lower pressure of the compressed air. The cold is produced by conducting the dry gases through a water bath where they evaporate approximately so much water as they require for their saturation with water vapor at the given temperature. Owing to the absorption of water vapor or to the evaporation of the water produced thereby, a corresponding amount of cold will be produced in the preliminary cooling apparatus.

A form of execution of the method and of the apparatus required for the carrying out of the method will be hereinafter described, it being supposed that in an oxygen producing apparatus the escaping nitrogen is utilized for the production of cold by evaporation and for the preliminary cooling of the compressed air.

The drawing represents a vertical section of the apparatus.

A receptacle *a* surrounded by an insulating jacket *b* is filled with water to the required level. The nitrogen escaping from the liquefier and separator is conducted by the tube *c* into a receptacle *d* and from there through a tube *e* under a sieve *f*. The finely distributed nitrogen filters now through the water column and escapes through the outlet tube *g*. The water which is evaporated is replaced from a water supply *h*. A serpentine tube *i* is arranged in the receptacle *a* and the compressed air which has to be cooled preliminarily flows through this serpentine from above to below in counter current to the nitrogen, whereby the air takes up the cold produced in the preliminary cooler.

I claim:—

Method of precooling air to be liquefied and separated into its constituents which consists in compressing said air, passing said compressed air in heat exchanging relation with water and cooling said water by conducting anhydrous gases therethrough in a finely divided state.

In testimony whereof I affix my signature in presence of two witnesses.

ADOLF MESSER.

Witnesses:
 IDA Y. BUCHARD,
 BERNHARD RUISER.